Patented Apr. 9, 1929.

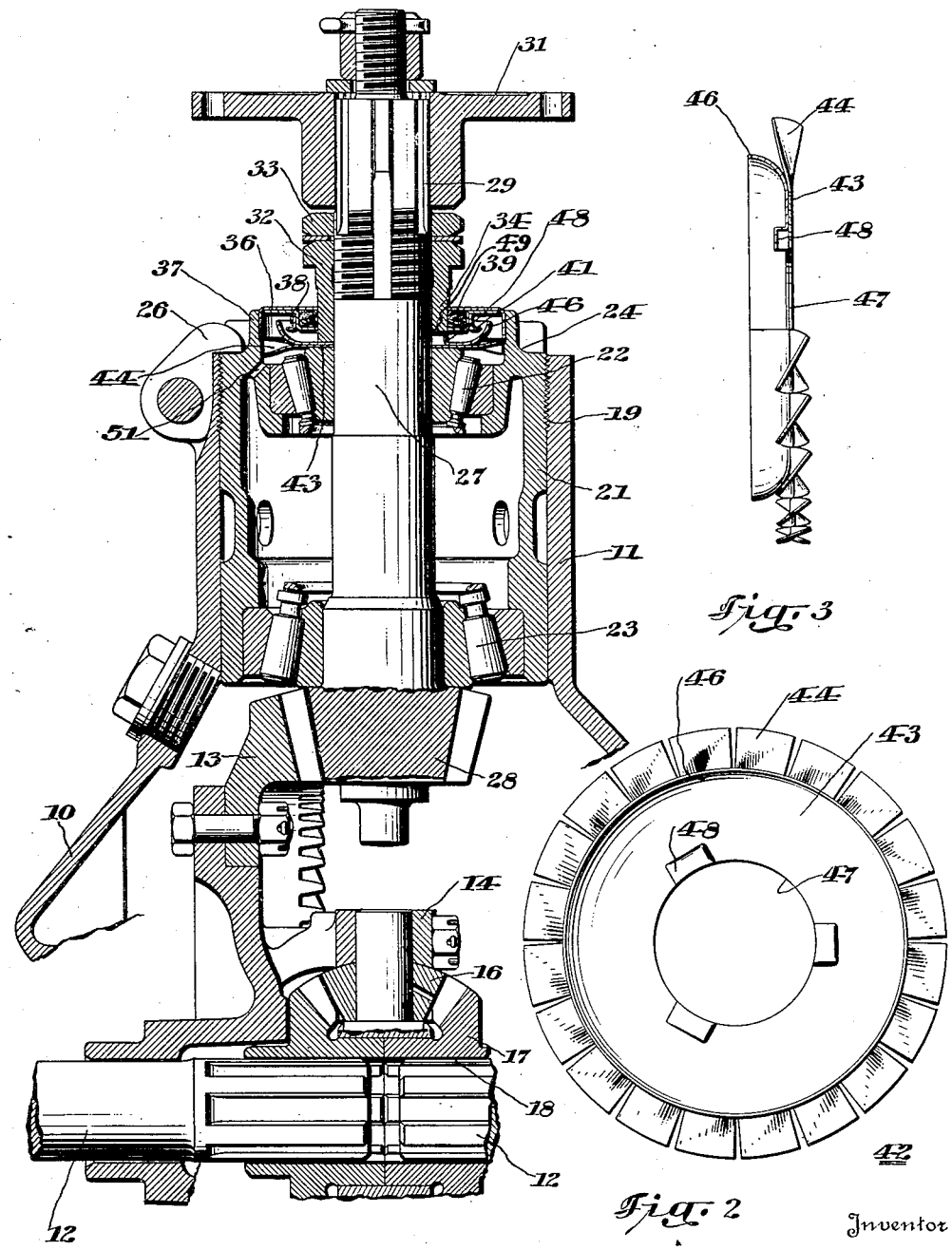

1,708,710

UNITED STATES PATENT OFFICE.

CHARLES H. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed November 9, 1923. Serial No. 673,796.

This invention relates to motor vehicles, more particularly to the drive mechanism thereof, and it has for an object to provide lubricant retaining means for the bearings of the drive shafts of such vehicles, which shall be simple in construction, inexpensive to manufacture, and efficient in operation.

Other objects of the invention will appear from the following description taken in connection with the drawing, which forms a part of this specification, and in which:

Fig. 1 is a longitudinal section through a portion of the driving axle of a motor vehicle, showing the application of the invention thereto;

Fig. 2 is a plan view of the lubricant retaining impeller and shield assembly which forms part of the invention, looking in the direction of the rear axle, and Fig. 3 is a view partially in section and partially in edge elevation of the device shown in Fig. 2.

Referring to the drawing, at 10 is indicated part of the rear axle housing of a motor vehicle having a forwardly projecting tubular portion 11. The housing 10 is provided with laterally extending tubular portions (not shown) in which are housed the axle shafts 12, to the outer ends of which the rear wheels of the vehicle are connected. Suitable differential and reduction gearing is enclosed in the housing 10. This gearing comprises a ring gear 13, to which is secured a differential cage 14 which carries differential pinions 16. Differential gears 17, having splined connections to the shafts 12 as shown at 18, are adapted to mesh with the differential pinions 16 in a well known manner.

The tubular extension 11 is threaded as shown at 19 for the reception of a sleeve 21, in which are mounted suitable bearings 22 and 23. The outer end of the sleeve 21 is provided with lock notches 24, adapted for cooperation with locking dogs 26 secured to the extension 11. The position of the bearings 22 and 23 with respect to the differential housing may be readily adjusted by screwing the sleeve 21 in or out, the dogs 26 serving to lock this sleeve in adjusted position.

Mounted in the bearings 22 and 23 is a drive shaft 27, provided on its inner end with a drive pinion 28, adapted to mesh with and drive the ring gear 13. The outer end of the drive shaft 27 has a splined connection 29 with the flange 31 of a suitable universal joint (not shown) by which the drive shaft 27 is operatively connected to the propeller shaft of the vehicle.

Adjustment of the bearings 22 and 23 within the sleeve 21 is effected by a nut 32, threaded on the shaft 27 and provided with a suitable lock nut 33. The shank portion of the nut 32 is tubular in shape, as shown at 34, thus providing a seat for cooperation with the stationary packing member 36.

The housing 10 is adapted to contain suitable lubricant, usually heavy oil, by which the differential and reduction gearing and the various shaft bearings are lubricated in a manner well understood in the art to which this invention relates. This lubricant is carried over into the interior of the sleeve 21 in any suitable manner, as by means of passages (not shown), and serves to lubricate the bearings 22 and 23, as is well understood. The end of the sleeve 21 is provided with a suitable closure to prevent the leakage of this lubricant, and to exclude dirt and dust from the interior of the housing.

Such closure means includes a packing member, which forms a seal between the running shaft and the housing and a lubricant impelling device which tends to force back into the housing any lubricant which may pass through the front bearing 22 and collect forwardly thereof.

The packing member 36 is preferably assembled of pressed sheet metal members, the outer of which has an inwardly disposed flange adapted to seat tightly in a flange 37 which forms an extension of the sleeve 21. The member 36 is also provided with an inwardly disposed circumferential flange 38, forming a channel adapted to hold a suitable packing ring 39. This channel carries a radially disposed shield flange 41.

Mounted inwardly of the packing member and adapted to cooperate therewith is the shield and impeller assembly. This includes an impeller 42, having a disk portion 43 provided with suitable vanes or blades 44 and a dished shield member 46 which is concave outwardly. The shield member 46 is preferably permanently secured to the impeller disk 43 in any suitable manner, as by welding. This impeller and shield assembly is adapted to seat on the inner race ring of the bearing 22, and it is provided with a hole 47 by which it is centered on the shaft 27. Disposed about the hole 47 are a number of drive lugs 48, preferably pressed up during the formation of the piece. These lugs cooperate with suitable drive notches 49, formed on the inner end of the nut 32, so that the impeller is tightly clamped between this nut and the bearing race, and is positively driven by the shaft 27 through the nut.

The operation of this device will be readily understood. Any lubricant from the interior of the sleeve 21 which works through the bearing 22 is not permitted to collect behind the packing member 36, but will be forced back by the pumping action of the rapidly rotating vanes 44. Suitable return passages 51 may be provided to expedite the return of this lubricant. All dirt and dust is excluded from the interior of the sleeve 21 and the housing 10 by means of the packing member 36, the packing ring 39 of which bears against the tubular portion of the nut 32, forming a seal therewith. The overlapping cooperation of the flange 41 with the dished shield 46 also assists in maintaining an oil and dust tight closure for the housing 11.

It will be seen that by this invention is provided a device which efficiently prevents the egress of oil from the shaft housing, positively returning such oil to the interior of the housing. Also, the structure is of simple construction, the parts thereof being made by the relatively inexpensive stamping process, and it may be assembled quickly and without difficulty.

It will be understood that various forms of the invention other than those described above may be used without departing from the spirit or scope of the invention.

What is claimed is:

1. The combination with a motor vehicle having an axle housing adapted to contain lubricant and a drive shaft mounted in the housing, of an adjusting nut threaded on said shaft, and a vaned impeller clamped to the shaft by and driven from the nut and adapted to prevent the egress of lubricant from the housing.

2. The combination with a motor vehicle and a drive shaft, of a housing adapted to contain lubricant, a lubricant retaining device comprising a vaned impeller of stamped metal adapted to be driven from the shaft, and a dished shield permanently secured to the impeller.

3. The combination with a motor vehicle and a drive shaft, of a housing adapted to contain lubricant, a tubular nut threaded on the shaft and having radial driving notches in its inner end, and a vaned lubricant retaining impeller surrounding and clamped to the shaft having radial driving lugs cooperating with said notches.

4. The combination with a motor vehicle having a shaft mounted in bearings, of a housing adapted to contain lubricant, a tubular nut threaded on the shaft, a lubricant retaining device for the housing comprising a packing member carried by the housing and cooperating with the nut, and a vaned impeller driven from the nut and having a dished shield cooperating with the packing member.

5. The combination with a motor vehicle having a drive shaft mounted in bearings, of a housing adapted to contain lubricant, a tubular nut threaded on the shaft, a lubricant retaining device for the housing comprising a cover member carried by the housing and having a packing ring cooperating with the nut and an inwardly disposed flange, a dished shield cooperating with said flange, and a vaned impeller positively driven from the nut and permanently secured to the shield.

6. The combination with a motor vehicle of an axle housing adapted to contain lubricant and having a projecting portion provided with a lubricant passage, a bearing supported in said portion and lubricated from said housing, a shaft journaled in said bearing, and means to force the return of lubricant passing the bearing to the housing through said passage.

7. The combination with a motor vehicle of an axle housing adapted to contain lubricant and having a projecting portion provided with a lubricant passage, a bearing supported in said portion and lubricated from said housing, a shaft journaled in said bearing, and means including a vaned impeller adapted to return lubricant which passes the bearing to the housing through said passage.

8. The combination with a motor vehicle of an axle housing adapted to contain lubricant and having a projecting portion provided with a lubricant passage, a bearing supported in said portion and lubricated from said housing, a shaft journaled in said bearing, and means including a vaned impeller to assist the circulation of lubricant from the housing through the bearing and back through said passage to the housing.

9. The combination with a motor vehicle of an axle housing adapted to contain lubricant and having a projecting portion provided with a lubricant passage, a bearing supported in said portion and lubricated from said housing, a shaft journaled in said bearing, and means including a rotary impeller secured to the shaft to return to the housing through said passage the lubricant which passes the bearing.

10. In a motor vehicle, in combination, an axle housing adapted to contain lubricant, a drive shaft mounted in the housing, a bearing in the housing for the shaft, the housing having a conduit forming a passage around the bearing, and a lubricant retaining device comprising an impeller adapted to return lubricant escaping from the bearing to the housing through and around the bearing.

In testimony whereof I affix my signature.

CHARLES H. VINCENT.